(12) United States Patent
Parker

(10) Patent No.: US 11,586,953 B2
(45) Date of Patent: Feb. 21, 2023

(54) SELECTION OF MACHINE LEARNING ALGORITHMS

(71) Applicant: BigML, Inc., Corvallis, OR (US)

(72) Inventor: Charles Parker, Corvallis, OR (US)

( * ) Notice: Subject to any disclaimer, the term of this patent is extended or adjusted under 35 U.S.C. 154(b) by 99 days.

(21) Appl. No.: 16/915,551

(22) Filed: Jun. 29, 2020

(65) Prior Publication Data

US 2021/0019639 A1  Jan. 21, 2021

Related U.S. Application Data

(63) Continuation of application No. 15/478,097, filed on Apr. 3, 2017, now abandoned.

(60) Provisional application No. 62/318,672, filed on Apr. 5, 2016.

(51) Int. Cl.

| | |
|---|---|
| *G06N 5/04* | (2006.01) |
| *G06N 20/00* | (2019.01) |
| *G06N 20/20* | (2019.01) |
| *G06N 5/00* | (2006.01) |
| *G06F 16/22* | (2019.01) |

(Continued)

(52) U.S. Cl.
CPC ............. *G06N 5/04* (2013.01); *G06F 16/22* (2019.01); *G06N 20/00* (2019.01); *G06N 20/20* (2019.01); *G06N 5/003* (2013.01); *G06N 7/005* (2013.01); *G06N 20/10* (2019.01)

(58) Field of Classification Search
CPC .......... G06F 16/22; G06F 15/18; G06F 17/30; G06N 5/04; G06N 99/00; G06N 99/005; G06N 7/005; G06K 9/6282; G06K 9/6253

See application file for complete search history.

(56) References Cited

U.S. PATENT DOCUMENTS

| | | | |
|---|---|---|---|
| 2007/0011188 A1* | 1/2007 | Chitgupakar | G06F 16/2465 707/999.102 |
| 2008/0077544 A1* | 3/2008 | Sureka | G06K 9/6253 706/13 |

(Continued)

OTHER PUBLICATIONS

Parker, Charles, Yasemin Altun, and Prasad Tadepalli. "Guest editorial: special issue on structured prediction." Machine learning 77.2 (2009): 161-164. (Year: 2009).*

(Continued)

*Primary Examiner* — Kamran Afshar
*Assistant Examiner* — Randall K. Baldwin
(74) *Attorney, Agent, or Firm* — FisherBroyles, LLP; Jeremy P. Sanders

(57) ABSTRACT

Systems and methods of selecting machine learning models/algorithms for a candidate dataset are disclosed. A computer system may access historical data of a set of algorithms applied to a set of benchmark datasets; select a first algorithm of the set of algorithms; apply the first algorithm to an input dataset to create a model of the input dataset; evaluate and store results of the applying; and add the first algorithm to a set of tried algorithms. The computer system may select a next algorithm of the algorithm set via submodular optimization based on the historical data and the set of tried algorithms; apply the next algorithm to the input dataset; capture a next result based on the applying; add the next result to update the set of tried algorithms; and repeat the submodular optimization. The procedure may continue until a termination condition is reached.

8 Claims, 6 Drawing Sheets

(51) Int. Cl.
*G06N 7/00* (2006.01)
*G06N 20/10* (2019.01)

(56) References Cited

U.S. PATENT DOCUMENTS

| | | | | |
|---|---|---|---|---|
| 2012/0191630 | A1* | 7/2012 | Breckenridge | G06N 20/00 706/12 |
| 2015/0134575 | A1* | 5/2015 | Traupman | G06Q 50/01 706/12 |
| 2015/0317582 | A1* | 11/2015 | Nath | G06Q 10/06311 705/7.13 |
| 2015/0370849 | A1* | 12/2015 | Steinberg | G06F 16/2246 707/690 |
| 2016/0275413 | A1* | 9/2016 | Shi | G06N 20/00 |
| 2017/0193392 | A1* | 7/2017 | Liu | G06N 20/00 |

OTHER PUBLICATIONS

Kandaa, Jorge, et al. "Selection of algorithms to solve traveling salesman problems using meta-learning." International Journal of Hybrid Intelligent Systems 8 (2011): 1-13. (Year: 2011).*

Feurer, Matthias, et al. "Efficient and robust automated machine learning." Advances in neural information processing systems. 2015. (Year: 2015).*

Guyon, Isabelle, et al. "A brief review of the ChaLearn AutoML challenge: any-time any-dataset learning without human intervention." Workshop on Automatic Machine Learning. PMLR, 2016: 1-10. (Year: 2016).*

* cited by examiner

SELECTION OF MACHINE LEARNING ALGORITHMS

RELATED APPLICATIONS

This application is a continuation of and claims priority benefit to U.S. application Ser. No. 15/478,097, filed Apr. 3, 2017, which claims priority to U.S. Provisional Application No. 62/318,672 filed on Apr. 5, 2016, each of which is hereby incorporated by reference in its entirety.

COPYRIGHT NOTICE

© 2015 BigML, Inc. A portion of the present disclosure may contain material that is subject to copyright protection. The copyright owner has no objection to the facsimile reproduction by anyone of the present disclosure, as it appears in the Patent and Trademark Office patent file or records, but otherwise reserves all copyright rights whatsoever.

TECHNICAL FIELD

The present disclosure pertains to data processing, and in particular systems and methods for identifying and selecting machine learning algorithms.

BACKGROUND

A variety of machine learning (ML) models may be used for various tasks, such as categorization and prediction. A panoply of possible ML algorithms may be used to generate these models, such as decision trees, support vector machines, Bayesian networks, and various combinations thereof. Choosing the best or even a "good enough" model to use for a particular application has largely been a matter of intuition, experience, and trial and error. This is partly a result of wide variability in the characteristics of input data sets.

The usual process of creating a machine learning model from a dataset includes training a first type of ML model that usually works well for a particular application, checking the performance of the first model (for example, on unseen-during-training holdout data), then trying a second ML model that usually works well to see if the second model performs better than the first model. This process may be repeated until a satisfactory level of performance of an ML model is achieved.

This somewhat haphazard approach to selecting ML models may cause overhead-related issues because there may be a relatively large number algorithms to be tested depending on the possible parameterizations of those algorithms. Therefore, attempting to execute each algorithm on a particular dataset may result in relatively large expenditures of time and/or computational resources.

BRIEF DRAWINGS DESCRIPTION

DETAILED DESCRIPTION

Figure 1:
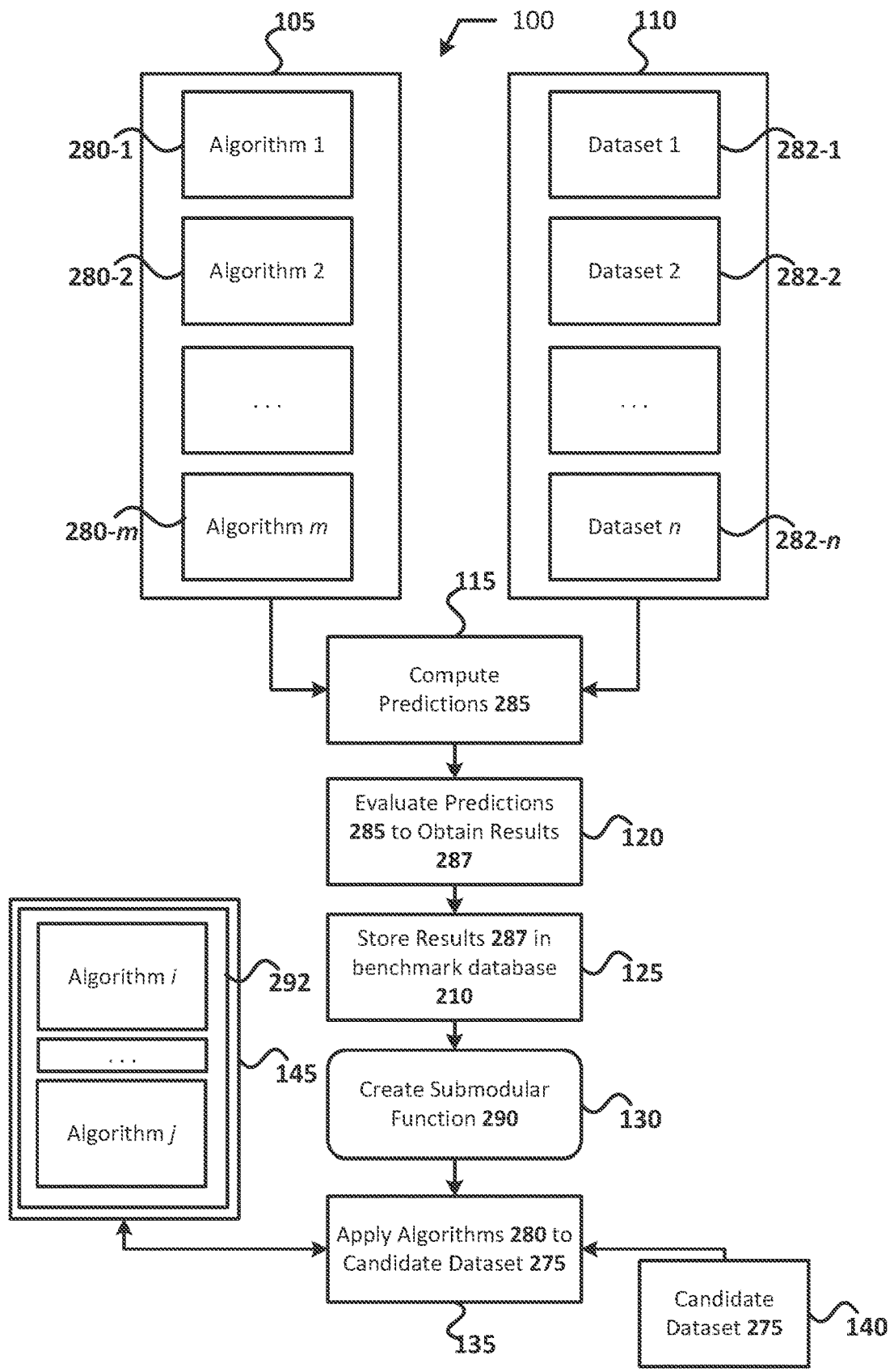
FIG. 1 illustrates a flow diagram for selecting an optimum algorithm for a candidate dataset, in accordance with various embodiments.

Embodiments discussed herein provide systems and methods for selecting machine learning (ML) algorithms and/or ML models. Generally, an ML algorithm is a computer program that learns from an experience (e.g., one or more datasets) with respect to some task and some performance measure. An ML model may be any object created after an ML algorithm is trained with one or more training datasets. After training, an ML model may be used to make predictions on new datasets. The various embodiments are discussed infra with regard to selecting ML algorithms. However, the embodiments discussed herein are also applicable to selecting models as well as selecting algorithms. Accordingly, the term "algorithm" as discussed herein may be interchangeable with the term "model" even though these terms refer to different concepts.

In embodiments, a database of historical results of application of one or more ML algorithms/models on previous datasets may be used to for selecting a next candidate model for an input dataset. The selection of a next candidate model may be based on a set of previously attempted parameters or criteria. In embodiments, a sequence of candidates may be created by attempting actions that are likely to work well according to various parameters/criteria, and attempting actions that are uncorrelated to one another. In this way, new models that may be desirable may be discovered when the same or similar models were not previously desirable when applied to similar datasets.

Conventional techniques for dealing with ML model selection include "grid searches," whereby essentially all possible algorithms are tried to the degree that this is possible. Another conventional approach includes "random searches" where random algorithms are tried for as much time is allowed, and a best algorithm tried among these is returned. Other conventional approaches focus on trying to find the best algorithm given only part of the information above. For example, a "meta-learning" approach may use historical data and statistical analysis of the current data to try to find a best algorithm given the data. While such an approach provides a good idea about the first model to try, a "second best" model suggested by such techniques will very likely be something conceptually close to the first model, not taking into account that this an algorithm space has already been explored to a degree. Another related approach includes Bayesian parameter optimization. While this technique focuses on selecting a sequence of candidates to evaluate, this technique does so by finding the "best parts" of the algorithm space by experiment, then finding subareas of the space that work better. However, Bayesian parameter optimization typically does not use historical data to determine other parts of the algorithm space that are uncorrelated and may also work well. Using the aforementioned approaches may result in relatively large expenditures of time and/or computational resources.

In contrast to conventional approaches, various embodiments include using historical performance data (also referred to as "benchmarks", "benchmark datasets", and the like) to inform the search for a best or optimum ML algorithm and/or ML model. In various embodiments, a computing system may generate a set of algorithms that have already been tried on the current dataset based on a given dataset or a set of datasets, a variety of ML algorithms or models, and historical data indicating various performance metrics of the algorithms/models on various benchmark datasets. In embodiments, the computing system may not generate the algorithms themselves; rather, the computing system may generate a list (or set) of the ML models/algorithms that have been applied to the dataset.

In embodiments, a historical database (also referred to as a "benchmark database" and the like) including the historical performance data may be created "off-line" before learning processes begin. In embodiments, the historical performance data may include any data relating to performance of a particular ML algorithm/model. In embodiments, the historical performance data may indicate how well an ML algorithm/model fits or predicts a certain dataset. In some embodiments, historical performance data may take into account required processor resources, memory utilization, input/output (I/O) operations, network resources, and the like. In embodiments, the computing system may generate and evaluate multiple ML, models/algorithms and may choose an optimum ML algorithm/model, which may be an ML algorithm/model that fits desired parameters/criteria (e.g., predicting a desired number data points, etc.) better than other ML algorithms/models, executes or otherwise performs faster than other ML algorithms/models, and/or uses the least amount of resources compared to resources used by other ML algorithms/models.

Embodiments provide that a submodular function may be utilized by the computing system to select a next candidate algorithm/model to test against a candidate dataset. A submodular function (also referred to as a "submodular set function" and the like) may be a set function whose value, informally, has the property that the difference in the incremental value of the function, that a single element makes when added to an input set, decreases as the size of the input set increases. Submodular functions may have a natural diminishing returns property, which may make them suitable for many applications, including approximation algorithms, game theory (as functions modeling user preferences), electrical networks, and the like.

In various embodiments, the computing system may implement the submodular function to select an ML algorithm/model from a set of m algorithms/models that worked best or was optimal for one or more datasets of a set of n datasets, where m and n are numbers. As used herein the term "best algorithm/model", "optimum model", and the like may refer to an ML algorithm/model that is fulfills the predetermined criteria/parameters and/or is more economical/cost-effective (in terms of speed, computer resource usage, and the like) than other tested algorithms/models. In various scenarios, one of the m algorithms/models may be the best/optimum algorithm/model for the largest number of datasets in the set of n datasets, which in various embodiments may be applied to each of the n datasets. For all datasets for which the selected algorithm/model is not the best/optimum, another algorithm/model of the set of m algorithms/models, which is the best for the greatest number of the remaining n datasets, may be discovered. This process may be repeated until there are no datasets left in the set of n datasets.

Referring now to the figures. FIG. 1 illustrates a flow diagram for practicing various example embodiments. In process 100, operations 105-130 may be performed before learning or training begins and operations 135-145 may be performed as part of a learning or training process. Additionally, operations 105-130 maybe an example "off-line" process to build a historical database (also referred to herein as a "benchmark database"). At operation 105, a set of m number of modeling algorithms 280 (also referred to as "algorithms 280", "algorithms 280", and the like) may be collected, and at operation 110, a benchmark collection of n number of datasets 282 may be collected or otherwise made available. The size of m and/or n may be quite large because performance or computing costs are not important at this stage of process 100.

Operation 115 may include running/executing each possible algorithm 280 on each one of the benchmark datasets 282 to obtain predictions 285. For example, data from a benchmark dataset 282 may be used as an input to an algorithm 280, and the resulting output may be a prediction 285. In some embodiments, operation 115 may include generating one or more ML models to be used to obtain the predictions 285. The act of computing predictions 285 on a selected one of the datasets 282 using a selected one of the algorithms 280 may be referred to as a "test" and the like. In some cases, fewer tests or selected ones could be run rather than testing all of the benchmark datasets 282 using all of the algorithms 280. In some embodiments, the process 100 may include running/executing a first algorithm 280 (e.g., algorithm 280-1) on one or more of the benchmark datasets 282 until one or more criteria or conditions are satisfied, recording/storing various data items associated with the one or more criteria or conditions, and then repeating this process for each algorithm 280 in the set. In embodiments where m=n, at most $n^2$ tests may be run. The number of algorithms 280 and the number of benchmark datasets 282 need not be equal. In some embodiments, for m algorithms 280 and n benchmark 282 datasets, at most $n^m$ tests may be run.

At operation 120, the resulting predictions 285 may then be evaluated in various ways to obtain results 287. As one example, predictions 285 may be compared to a holdout dataset. In this example, a portion of the predictions 285 may be "withheld" as the holdout dataset, and one or more tests may be performed on the holdout dataset to determine how well the selected algorithm 280 forecasts or predicts the remaining portion of the predictions 285 (within a certain margin of error). Furthermore, the algorithm 280 may be ranked or scored according to a number of data points in the remaining portion that were accurately forecasted/predicted by the algorithm 280 (within a certain margin of error). In another example, the evaluation may include performing a two-fold cross-validation procedure on the predictions 285, such as by randomly assigning data points in the predictions 285 to two separate data (e.g., set 1 and set 2) having an equal size. ML training may be performed on set 1, and testing may be performed on set 2, followed by ML training on set 2 and testing on set 1. The algorithm 280 may be ranked or scored according to a number of data points in the set 1 that were accurately forecasted/predicted by set 2, and vice versa (within a certain margin of error). Other validation or evaluation procedures may be used.

At operation 125, the evaluation results 287 (also referred to as "benchmarks") may be stored in the benchmark database 210 (see FIG. 2) along with related data, including identifiers of the corresponding algorithms 280 and benchmark datasets 282. The benchmark database 210 may be the historical performance database since the benchmarks 287 stored therein are based on tested algorithms 280. The evaluation of predictions 285 may be performed at any convenient time and/or place where appropriate computing resources are made available. Such resources may be provisioned remotely or "in the cloud."

At operation 130, the results 287 of the benchmark evaluation stored in the benchmark database 210 may be used to create a submodular function 290. The submodular function 290 may describe the likelihood that a best possible or optimum algorithm 280 has already been tried/tested given a current set of experiments. In embodiments, the submodular function 290 may be optimized using known techniques.

Operation 135 may be the beginning of the learning or training process. At operation 135, given an input or candidate dataset 275 at operation 140, a first algorithm 280 (e.g., algorithm 280-1) may be selected and applied to the candidate dataset 275. The candidate dataset 275 may be a dataset for which an optimum algorithm 280 is to be discovered. One goal of the example embodiments may include identifying the optimum algorithm 280 using as few tests/evaluations as possible in order to save time, effort, and computational and/or network resources. Another goal of the example embodiments may include identifying a subset of algorithms 280 that is likely to include the best or optimum algorithm 280 for the candidate dataset 275 regardless of the data, format or type, and/or other properties of the candidate dataset 275. Thus, in some embodiments, the set or sequence of algorithms 280 that are applied against the candidate dataset 275 (e.g., as identified by the submodular function 290 at operation 130) may be a relatively small subset of the whole set of algorithms 280 (e.g., the set of algorithms 280 identified at operation 105) used to generate benchmark data (e.g., the results obtained at operation 125). Application of the first algorithm 280-1 may include using data of the candidate dataset 275 as an input to the first algorithm 280-1. The results 287 of applying the first algorithm 280-1 to the candidate dataset 275 may be evaluated, and at operation 145, the tested (selected) algorithm 280-1 may be added to a list of algorithms 292 tested on the candidate dataset 275 (e.g., as algorithm i in FIG. 1).

Operation 135 may also include selecting a next algorithm (e.g., algorithm 280-2) according to the submodular function 290, which was created at operation 125 based on the benchmark database 210. The next algorithm 280-2 may be tested on the candidate dataset 275, results 287 of applying the algorithm 280-2 to the candidate dataset 275 may be evaluated, and the algorithm 280-2 may be added to the list of tested algorithms 292 at operation 145. This procedure is repeated until all algorithms 280 (or a selected subset of the algorithms 280) are tested on the candidate dataset 275, and/or until results that are deemed satisfactory are achieved thereby populating the list of tested algorithms 292 with algorithms i-j. In this way, process 100 may be used to identify or select a candidate algorithm 280 whose performance is likely to be superior to the set of already-tested algorithms.

Figure 2:
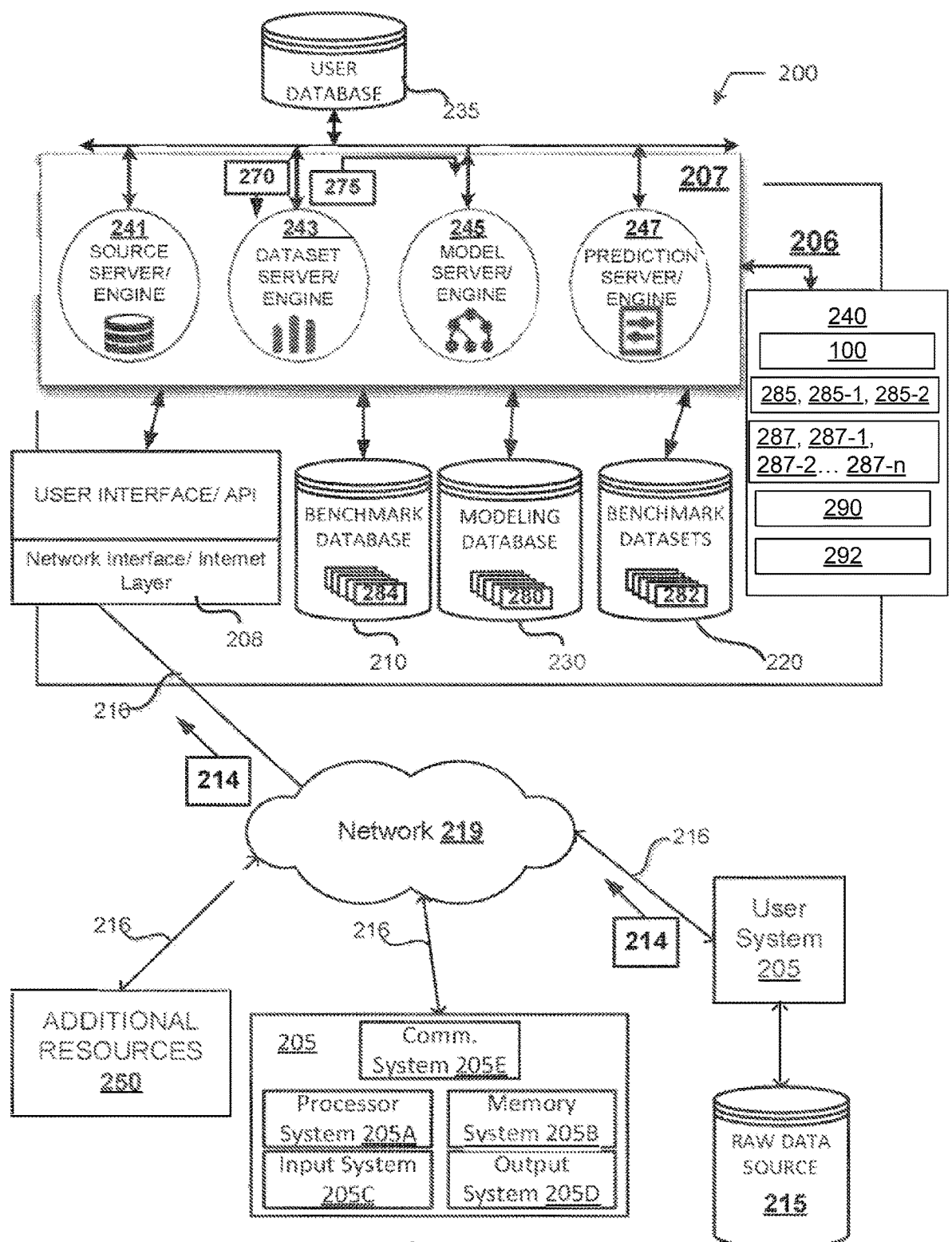
FIG. 2 illustrates an example environment in which embodiments of the present disclosure may be implemented.

FIG. 2 illustrates an example environment 200 in which various embodiments of may be implemented. In FIG. 2, a user system 205 may be coupled to a computing system 206 via a network 219. As shown, the user system 205 may include a processor system 205A, a memory system 205B, an input system 205C, an output system 205D, and a communications system 205E. The computing system 206 may include the processor system 207 (also referred to as a "server system 207" and the like), the network interface 208, benchmark database 210, benchmark dataset database 220, modeling algorithms database 230 (also referred to as a "model algorithm database 230", "algorithm database 230", "modeling database 230", and the like), and the data storage system 240.

Referring to the user system 205, the memory system 205B may include an operating system (OS), one or more databases (not shown), and one or more applications (not shown). The processor system 205A can include any suitable combination of one or more processors, such as one or more central processing units (CPUs) including single-core or multi-core processors, one or more graphics processing units (GPUs), one or more field-programmable gate arrays (FPGAs), or any other electronic circuitry capable of executing program code and/or software modules to perform arithmetic, logical, and/or input/output operations.

The memory system 205B can include any suitable combination of one or more memory devices that may be embodied as any type of volatile or non-volatile memory or data storage. Memory system 205B may generally include volatile memory (e.g., random access memory (RAM), synchronous dynamic RAM (SDRAM) devices, double-data rate synchronous dynamic RAM (DDR SDRAM) device, flash memory, and the like), non-volatile memory (e.g., read only memory (ROM), solid state storage (SSS), non-volatile RAM (NVRAM), and the like), and/or other like storage media capable of storing and recording data. The memory system 205B may be configured to store an operating system (OS) and program code for one or more software components or application(s). Instructions, program code and/or software components may be loaded into the memory system 205B by one or more network elements (not shown) via communications system 205E using wired or wireless communications interfaces. In some embodiments, the program code and/or software components may be loaded into the memory system 205B during manufacture of the user system 205, or loaded from a separate computer readable storage medium into the memory system 205B using a drive mechanism (not shown), such as a memory card, memory stick, removable flash drive, removable sim card, a secure digital (SD) card, and/or other like computer readable storage medium (not shown).

The input system 205C may include one or more interfaces, components or devices designed to enable interaction with the user system 205. The output system 205D can include any suitable combination of output devices, such as one or more display devices, printers, or interfaces to networks. The input system 205C may include user interfaces and devices such as a physical keyboard or keypad, mice, trackballs, a touchpad, touchscreen, a speaker, a microphone, a fingerprint or handprint scanning device, etc. In embodiments, the input system 205C and/or the output system 205D may include peripheral component interfaces, such as a non-volatile memory port, communications ports (e.g., universal serial bus (USB) port, FireWire port, Serial Digital Interface (SDI) port), IEEE 1284 port, etc.), an audio jack, a power supply interface. In some embodiments, the input system 205C and/or the output system 205D may include, memory controller hubs, input/output control hubs, firmware devices, communication links (i.e., point-to-point links, bus links, wires, cables, light guides, printed circuit board traces, etc.) and/or other components and subsystems to facilitate the I/O operations.

The communications system 205E may include circuitry for communicating with a wireless network or wired network. Communications system 205E may be used to establish a link 216 (also referred to as "channel 216," "networking layer tunnel 216," "internet layer tunnel 216", and the like) through which the user system 205 may communicate with the computing system 206. The Communications system 205E may enable the user system 205 to communicate with computing system 206 using Transfer Control Protocol and Internet Protocol (TCP/IP) and, at a higher network level, other common Internet protocols to communicate, such as Hypertext Transfer Protocol (HTTP), File Transfer Protocol (FTP), etc. To do so, the communications system 205E may include one or more processors (e.g., baseband processors, etc.) that are dedicated to a particular wireless communication protocol (e.g., Wi-Fi and/or IEEE 802.11 protocols), a cellular communication protocol (e.g., Long Term Evolution (LTE) and the like), a wireless personal area network (WPAN) protocol (e.g., IEEE 802.15.4-802.15.5 protocols, Bluetooth or Bluetooth low energy (BLE), etc.), and/or a wired communication protocol (e.g., Ethernet, Fiber Distributed Data Interface (FDDI), Point-to-Point (PPP), etc.).

The communications system 205E may also include hardware devices that enable communication with wireless/wired networks and/or other user systems 12 using modulated electromagnetic radiation through a solid or non-solid medium. Such hardware devices may include switches, filters, amplifiers, antenna elements, and the like to facilitate the communications over the air or through a wire by generating or otherwise producing radio waves to transmit data to one or more other devices, and converting received signals into usable information, such as digital data, which may be provided to one or more other components of user system 205. To communicate (e.g., transmit/receive) with the computing system 206, the user system 205 using the communications system 205E may establish link 216 with network interface 208 of the computing system 206.

During operation, a user system 205 may obtain and upload raw data 215 to the computing system 206 via a link 216 for processing. To this end, the processor system 205A may implement an application (e.g., a locally stored application, a web application, a native application, and the like) to generate and send message 214 to the computing system 206. The message 214 may be a request to convert the raw data 215 into one or more user datasets and/or candidate datasets 275, and in such embodiments, the message 214 may include the raw data 214 to be converted. In some embodiments, the message 214 may be a request to store the raw data 214 in one or more data elements, records, and/or fields in one or more database object(s) of user database 235. In some embodiments, the message 214 may include one or more targets indicating fields or records to be searched in user database 235 for data to be converted into the user datasets and/or candidate datasets 275. In such embodiments, the message 214 may also include one or more other options, conditions, filters, etc. (e.g., sort parameters, maximum result size, and the like) to be used to obtain data from user database 235. In embodiments, the message 214 may be an HTTP message, where the raw data 215, credentials, and/or other pertinent information may be located in the header or body portion of the HTTP message. Other message types may be used to convey the message 214, such as a Session Initiation Protocol (SIP) message, or any message used in the Internet protocols discussed previously.

The applications that enable communication with the computing system 206 may utilize any suitable query language to query, store, and obtain information in/from user database 235, such as structured query language (SQL), object query language (OQL), object search language (OSL), and/or other like query languages. In some embodiments, these applications may provide a graphical user interface (GUI) that displays a visualization of the raw data 215 and/or data in user database 235. The GUI may include various graphical control elements, and may convert selections of the graphical control elements into suitable requests using the aforementioned query languages. Such applications may be designed to run on a specific platform, such as when the user system 205 is implemented in a mobile device, such as a smartphone, tablet computer, and the like. Furthermore, such applications may also enable the user system 205 to provide authentication credentials (e.g., user identifier, password, personal identification number (PIN), biometric data, etc.) to the computing system 206 so that the computing system 206 may authenticate the identity of a user of the user system 205. Suitable implementations for the OS, databases, and applications, as well as the general functionality of the user system 205 are known or commercially available, and are readily implemented by persons having ordinary skill in the art, particularly in light of the disclosure herein.

Network 219 may be any network that allows computers to exchange data. Network 219 may include one or more network elements (not shown) capable of physically or logically connecting computers. The network 219 may include any appropriate network, including an intranet, the Internet, a cellular network, wireless network, cellular network, a local area network (LAN), wide area network (WAN), a personal or enterprise network, point-to-point network, star network, token ring network, hub network, or any other such network or combination thereof. Components used for such a system can depend at least in part upon the type of network and/or environment selected. Protocols and components for communicating via such a network are well known and will not be discussed herein in detail. Communication over the network 219 may be enabled by wired or wireless connections, and combinations thereof.

Referring to the computing system 206, the computing system 206 may include data storage system 240, the processor system 207, a network interface 208, and the various databases 210-235. The processor system 207 may be implemented to include any suitable combination of one or more processors, such as one or more central processing units (CPUs) including single-core or multi-core processors, one or more graphics processing units (GPUs), one or more field-programmable gate arrays (FPGAs), or any other electronic circuitry capable of executing program code and/or software modules to perform arithmetic, logical, and/or input/output operations. In various embodiments, the processor system 207 may include one or more modules or engines that perform one or more functions as discussed herein, such as a source engine 241, a dataset engine 243, a model engine 245, or a prediction engine 247. In some embodiments, program code for the various engines/modules may be stored in the data storage system 240 and executed by the processor system 207. In other embodiments, each of the engines/modules may be embodied as an FPGA or as some other dedicated processor circuitry. In other embodiments, the processor system 207 may be implemented as a server system 207 (each with their own processor(s), memory device(s), I/O interfaces, network interfaces, and configured with suitable program code), where each server in the server system 207 carries out one or more functions as discussed herein.

Network interface 208 may be embodied as any type of communication circuit(s), device(s), hardware component(s) or collection thereof, capable of enabling communications between the computing system 206 and the user systems 12 via one or more communication networks (e.g., network 219). To this end, network interface 208 may include one or more communication interfaces (e.g., ports) and one or more dedicated processors and/or FPGAs to communicate using one or more wired network communications protocols, such as Ethernet, token ring, Fiber Distributed Data Interface (FDDI), Point-to-Point Protocol (PPP), network sockets, and/or other like network communications protocols). The communication interfaces may be configured to communicatively couple the computing system 206 to any number of other nodes 110, the interconnect device 120, networks (e.g., physical or logical networks), and/or external computer devices. In this regard, each communication interface may be associated with a network socket address (e.g., a combination of an IP address and port number) or other like address that allows other devices to connect to the computer system 206. The network interface 208 may also include one or more virtual network interfaces configured to operate with the one or more applications of the computer system 206. In some embodiments, the network interface 208 may be implemented as a set of application servers (also referred to as "app servers"), where each app server is configured to communicate with one or more components of the computing system 206, and to serve requests received from the user systems 12. In addition, the network interface 208 may implement a user interface and/or application programming interface (API) to allow the user systems 12 to interact with the computing system 206.

The data storage system 240 may be computer-readable media having instructions stored thereon, which are executable by the processor system 207. Data storage system 240 may include program code for flow diagram 100, program code for processes of flow diagram 100, and processes 300-500 discussed with regard to FIGS. 3-5 (not shown by FIG. 2), and program code used for implementing the various functions of the database system 206, such as an operating system and one or more other applications. In some embodiments, the databases 210-235 may be stored within the data storage system 240, while in other embodiments, the databases 210-235 may be implemented in or by one or more separate/remote data storage systems. When the instructions are executed by the processor system 207, the computing system 206 may carry out the various functions of the system 206 and perform the various example embodiments described herein, such as the processes of flow diagram 100, and processes 300-500 discussed with regard to FIGS. 3-5. The data storage system 240 may be embodied as any type of device or devices configured for short-term or long-term storage of data such as, for example, memory devices and circuits, memory cards, hard disk drives, optical drives, removable disk drives (e.g., optical discs, digital versatile disks (DVD), compact disks (CD), etc.), solid-state drives, and/or any of the other types of memory devices discussed with regard to memory system 205B. The various instructions, or portions thereof, may be loaded into the data storage system 240 from removable/separate storage media using a drive mechanism, from remote computing system via network interface 208 (e.g., over the Internet or network 219 using any of the aforementioned communication protocols).

As discussed previously, the user system 205 may obtain the raw data 215, compile or otherwise include the raw data 215 in a message 214, and send the message 214 to the computing system 206 via a link 216. The raw data 215 may be converted into a candidate dataset 275 by the source server 241 and/or the dataset server 243. In such embodiments, the source server 241 and/or the dataset server 243 may store the candidate dataset 275 in the user database 235 or some other data storage device for later retrieval by the model server 245 and/or the prediction server 247. In embodiments, the benchmark database 210 may be created as described above and may be available to one or more processors 17 of the computing system 206. The benchmark database 210 may include a set of benchmarks 284, which may have been created using the stored set of benchmark datasets 282 stored in benchmark dataset database 220. A set of modeling algorithms 280 (also referred to as a "set of algorithms 280" and the like) may be stored in the modeling database 230, where the set of algorithms 280 includes m number of algorithms (where m is a number). The m number of algorithms may include 1 to m algorithms 280 where a first algorithms may be referred to as "algorithm 280-1", a second model may be referred to as "algorithm 280-2", and so forth until an mth algorithm may be referred to as "algorithm 280-$m$" (see e.g., FIG. 1). Each of the m number of algorithms 280 may be applied to the n number of benchmark datasets 282 stored in the benchmark dataset database 220 to produce the benchmarks 284. The benchmarks 284 (also referred to as "benchmark data 284" and the like) may provide a basis for determining a submodular function 290. The submodular function 290 may be used to choose a subset of the algorithms 280 to be applied against a candidate dataset 275. One benefit of using the submodular function 290 is that the submodular function 290 can suggest a set of "next" algorithms 280 that should be tried against the candidate dataset 275 based on a set of algorithms 280 that were already tested against the benchmark datasets 282. In addition, set of "next" algorithms 280 indicated by the submodular function 290 will likely include an optimum algorithm 280 that is better than other algorithms 280 for making predictions for a given candidate dataset 275. In addition, the set of "next" algorithms 280 may be a relatively small subset of the stored algorithms 280 in the modeling database 230, and thus, testing the algorithms 280 in the set of "next" algorithms 280 may be less time consuming and computationally intensive than using a randomized approach to choosing algorithms for a candidate dataset.

During operation, a user dataset 270 may be provided to the computing system 206 as noted previously (e.g., from raw data 215 and/or from user database 235), and the processor or server system 207 may carry out the operations discussed herein, such as:

(1) obtaining, by the dataset server 243, the user dataset 270 from the user database 235; (2) converting, by the dataset server 243, the user dataset 270 into a candidate dataset 275. In embodiments, converting the user dataset 270 into a candidate dataset 275 may include normalizing data in the user dataset 270, or performing other formatting operations on the user dataset 270; (3) selecting, by the model server 245, a first algorithm 280-1 from modeling database 230; (4) compute or otherwise determine predictions 285 by applying the first algorithm 280-1 to the candidate dataset 275 at the model server 245 and/or the prediction server 247; (5) evaluating, by the prediction server 247, the predictions 285 to obtain results 287 of applying the first algorithm 280-1 to the candidate dataset 275; (6) controlling storage, by the prediction server 247, of the predictions 285 and the results 287 in the data storage system 240 (or in some other database or data storage device); (7) adding, by the model server 245 and/or the prediction server 247, the selected first algorithm 280-1 to a list of algorithms 292 that are applied to the user dataset 270. The list of algorithms 292 may be stored in/by the data storage system 240; (8) creating/generating, by the model server 245 and/or the prediction server 247, a submodular function 290 based on benchmark data stored in the benchmark database 210, and controlling storage of the submodular function 290 in/by the data storage system 240; (9) applying, by the model server 245 and/or the prediction server 247, the submodular function 290 to select a second algorithm 280-2 of the algorithms 280 from the modeling database 230 (not shown by FIG. 2): (10) applying, by the model server 245 and/or the prediction server 247, the second algorithm 280-2 to the same candidate dataset 275 compute or otherwise determine predictions 285 for the second algorithm 280-2; (11) evaluating, by the prediction server 247, the predictions 285 to obtain results 287 of applying the second algorithm 280-2 to the candidate dataset 275; (12) adding the selected algorithm 280-2 to the list of algorithms 292 tried on the user dataset 270; and (13) repeating operations 1-13 until results that are deemed satisfactory are achieved.

The resulting (best) algorithm may be delivered or indicated to the user system 205 via the network 219. The best algorithm may be used to make predictions on the prediction server 247; which may interact with the user system.

The arrangement shown by FIG. 2 is merely illustrative, and in various other embodiments, some or all of the illustrated databases may be located elsewhere and accessible via the network 219. In addition, some or all of the databases illustrated by FIG. 2 may be located at a remote system 250 (labeled "additional resources 250" in FIG. 2). Furthermore, some or all of the servers illustrated (dataset, model, etc.) may be implemented as software in one or more computers, again located in computing system 206 or elsewhere, such as provided by a cloud computing service and the like.

FIGS. 3-7 illustrates processes 300-700, respectively, in accordance with various example embodiments. For illustrative purposes, the operations of processes 300-700 are described as being performed by entities discussed with regard to FIG. 2. In particular, process 300 is described as being performed by the source engine 241, process 400 is described as being performed by the dataset server 243, and process 500 is described as being performed by the model engine 245, and processes 600-700 are described as being performed by the prediction engine 247. However, it should be noted that other computing devices may operate the processes 300-700 in a multitude of implementations, arrangements, and/or environments. In embodiments, the computing system 206 may include program code (stored in data storage system 240), which when executed by the processor system 207, causes the computing system 206 to perform the various operations of processes 300-700. In other embodiments, the processes 300-700 may be performed by respective server systems as discussed previously. While particular examples and orders of operations are illustrated in FIGS. 3-7, in various embodiments, these operations may be re-ordered, separated into additional operations, combined, or omitted altogether.

Figure 3:
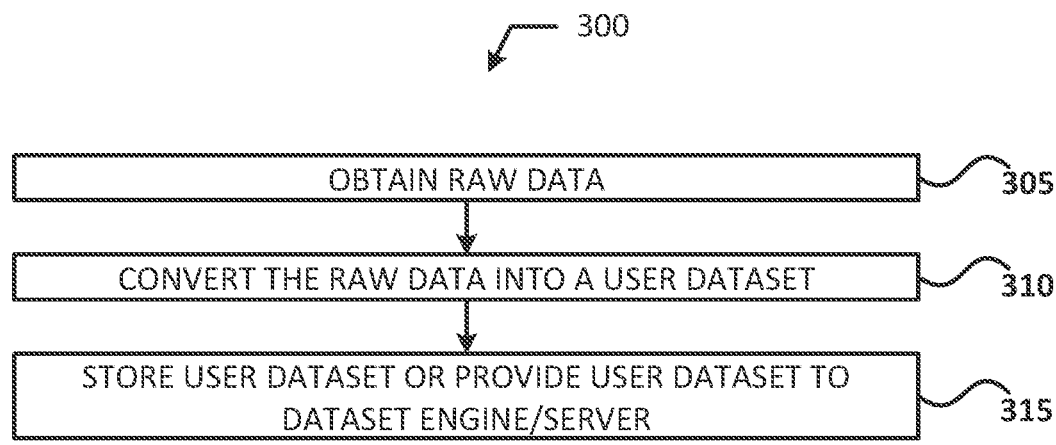
FIG. 3 illustrates an example for generating a user dataset, in accordance with various embodiments.

FIG. 3 illustrates a process 300 for generating a user dataset in accordance with various embodiments. Referring to FIG. 3, at operation 305 the source engine 241 may obtain raw data 215 from a user system 205 or various other sources. At operation 310, the source engine 310 may convert the raw data 215 into a user dataset 270. At operation 315, the source engine 241 may store the user dataset 270 in the user database 235, or may provide the user dataset 270 to the dataset engine 243. Process 300 may end or repeat as necessary after the source engine 241 performs operation 315.

In embodiments, the raw data 215 may be extracted from one or more messages 214 at operation 305. In some embodiments, the source engine 241 may normalize (e.g., index, partition, augment, canonicalize, etc.) the raw data 215 to convert the raw data 215 into the user dataset 270. Additionally or alternatively, at operations 305 and 310 the source engine 241 may obtain Extract-Load-Transform (ELT) data or Extract-Transform-Load (ETL) data, which may be raw data 215 extracted from various sources and normalized for analysis and other transformations. In some embodiments, at operation 315 the raw data 215 may be loaded into the user database 235 and/or some other data store (not shown by FIG. 2) and stored as key-value pairs, which may allow the data to be stored in a mostly native form without requiring substantial normalization or formatting. Other methods for normalizing and/or storing the user dataset 270 may be used.

Figure 4:
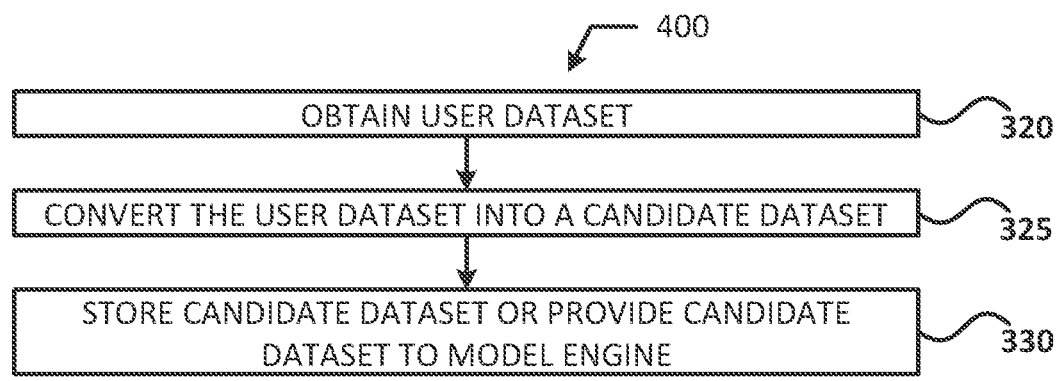
FIG. 4 illustrates an example process for generating a candidate dataset, in accordance with various embodiments.

FIG. 4 illustrates a process 400 for generating a candidate dataset in accordance with various embodiments. Referring to FIG. 4, at operation 320 the dataset engine 243 may obtain the user dataset 270. At operation 325, the dataset engine 325 may convert the user dataset 270 into a candidate dataset 275. At operation 330, the dataset engine 243 may store the candidate dataset 275, or provide the candidate dataset 275 to the model engine 245 and/or the prediction engine 247. Process 400 may end or repeat as necessary after the source engine 241 performs operation 330.

In some embodiments, at operation 325 the dataset engine 243 may normalize (e.g., index, partition, augment, canonicalize, etc.) the user dataset 270 to convert the user dataset 270 into the candidate dataset 275. This normalization procedure may be the same or different than the normalization procedure discussed with regard to FIG. 3. In embodiments, the dataset engine 243 may store the candidate dataset 275 in the user database 235 and/or some other data store (not shown by FIG. 2) for later retrieval by the model engine 245 or the prediction engine 247.

Figure 5:
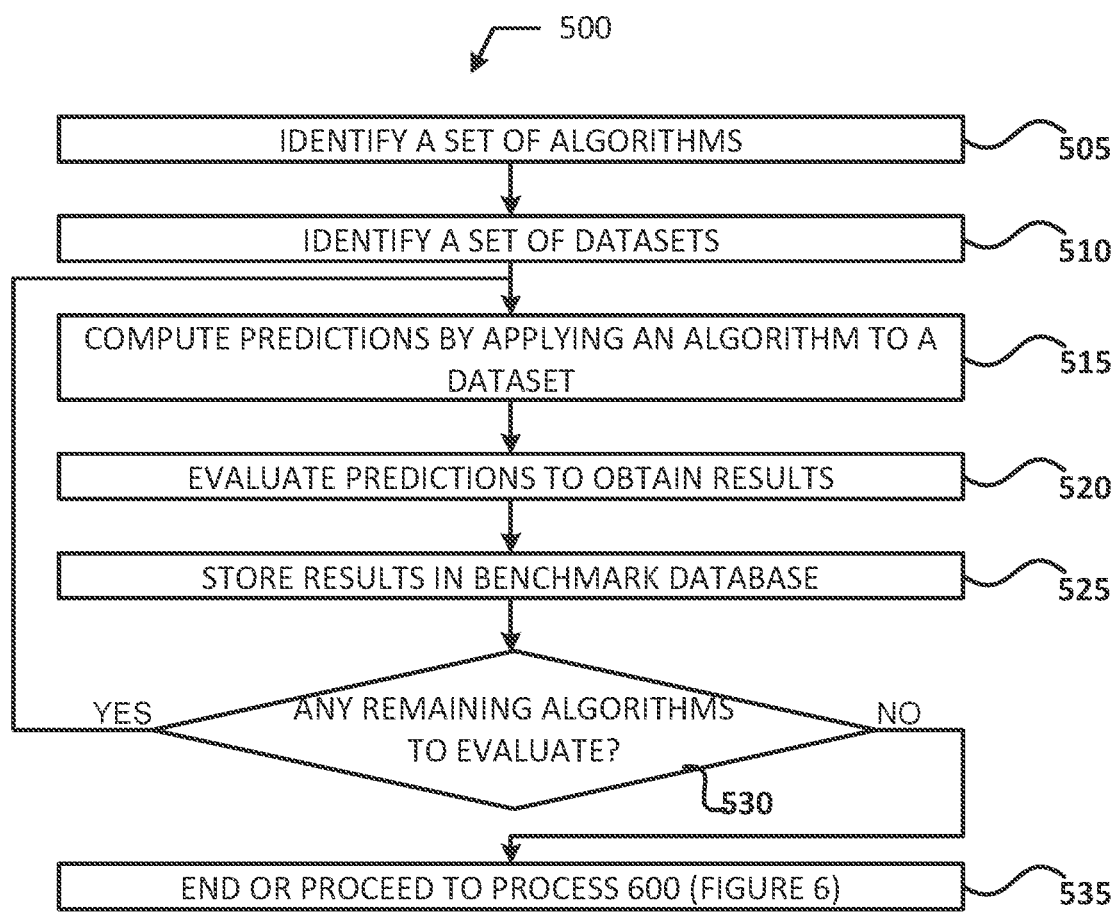
FIG. 5 illustrates an example process for generating benchmark data, in accordance with various embodiments.

FIG. 5 illustrates a process 500 for generating benchmark data 284 (also referred to as "historical performance data" and the like), in accordance with various embodiments. Referring to FIG. 5, at operation 505, the model engine 245 may identify a set of algorithms, and at operation 510, the model engine 245 may identify a set of datasets. At operation 515, the model engine 245 may compute predictions 285 by applying individual algorithms 280 of the set of models to individual datasets 282 of the set of datasets. In embodiments, the model engine 245 may use data of an individual dataset 282 as an input to an individual algorithm 280. The output of the individual algorithm 280 may be the predictions 285. In some embodiments, the model engine 245 may generate one or more models to be used for obtaining the predictions 285, where the datasets may be input to the one or more models and a resulting output may be the predictions 285.

At operation 520, the model engine 245 may evaluate the predictions 285 to obtain results 287. In embodiments, the results 287 may be results of performing a holdout procedure, a cross-validation procedure, or some other like ML testing procedure that is used to assess the strength and/or utility of a predictive algorithm or model. In other embodiments, the results 287 may include other metrics or metadata pertaining to performance of the applied algorithm 280, such as speed (e.g., time from initiating execution to obtaining an output) of one or more tasks, computing resource usage, etc. At operation 525, the results 287 may be stored in a benchmark database 210.

At operation 530, the model engine 245 may determine if there are any remaining algorithms of the set of algorithms that need to be evaluated. If at operation 530 the model engine 245 determines that there is an individual algorithm of the set of algorithms that needs to be evaluated, the model engine 245 may proceed back to operation 515 to compute predictions using the next individual algorithm. If at operation 530 the model engine 245 determines that there is no individual algorithms of the set of algorithms that need to be evaluated, the model engine 245 may proceed to operation 535 to end or proceed to process 600 (shown and described with regard to FIG. 6) to evaluate algorithms to be used for a candidate dataset 275.

Figure 6:
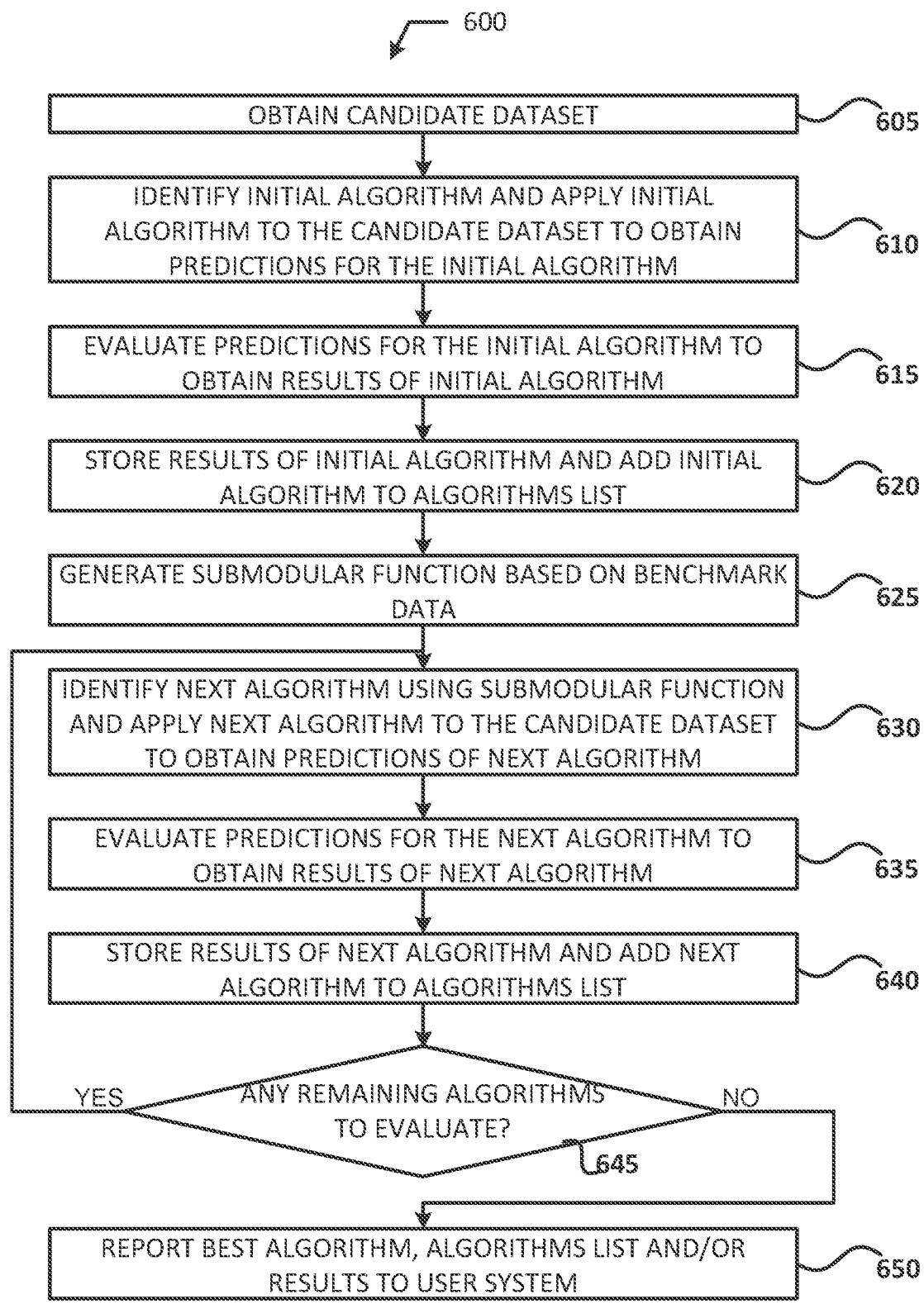
FIG. 6 illustrates an example process for selecting an optimum algorithm for a candidate dataset, in accordance with various embodiments.

FIG. 6 illustrates a process 600 for selecting an optimum algorithm 280 for a candidate dataset 275, in accordance with various embodiments. Referring to FIG. 6, at operation 605, the prediction engine 247 may obtain the candidate dataset 275. At operation 610, the prediction engine 247 may identify an initial algorithm 280-1 and apply the initial algorithm 280-1 to the candidate dataset 275 to obtain predictions 285-1 (not shown by FIG. 2) for the initial algorithm 280-1. In various embodiments, operations 605 and 610 may be performed by the model engine 245, and in such embodiments, the predictions 285-1 may be passed to the prediction engine 247 or may be stored for later retrieval by the prediction engine 247.

At operation 615, the prediction engine 247 may evaluate the predictions 290-1 to obtain results 287-1 (not shown by FIG. 2) of the initial algorithm 280-1. At operation 620, the prediction engine 247 may store the results 287-1 and add the initial algorithm 280-1 to the algorithms list 292. At operation 625, the prediction engine 247 may generate a submodular function 290 based on benchmark datasets 282 stored in the benchmark dataset database 220. At operation 630, the prediction engine 247 may identify a next algorithm 280-2 and may apply the next algorithm 280-2 to the candidate dataset 275 to obtain predictions 285-2 of the next algorithm 280-2. At operation 635, the prediction engine 247 may evaluate the predictions 285-2 to obtain results 287-2 of the next algorithm 280-2, and at operation 540, the prediction engine 247 may store the results 287-2 and add the next algorithm 280-2 to the algorithms list 292.

At operation 645, the prediction engine 247 may determine whether there are any remaining algorithms 280 to be evaluated against the candidate dataset 275. Whether there are any remaining algorithms 280 to be evaluated may be based on the size of the subset of algorithms 280 to be evaluated. In some embodiments, the number of algorithms 280 to be evaluated may be a user input, which may be based on the amount of time and/or computational resources that the user is willing and/or able to devote to the evaluation process. In other embodiments, the size of the subset of algorithms 280 to be evaluated may be a predetermined number, based on the type of data in the candidate dataset 275, or based on any other criteria. For example, in some scenarios, an evaluation of an algorithm 280 may take an entire day to complete, and in such scenarios, limiting the number of evaluations can save a considerable amount of time and resources while still providing the user with confidence that the best/optimum algorithm 280 has been discovered. Even where a user has unlimited time and resources, in cases where large amounts of data and/or hundreds of potential algorithms 280 that could be used, the size of the subset of algorithms 280 to be evaluated could be used to speed up the evaluation process.

If at operation 645 the prediction engine 247 determines that there are remaining algorithms 280 to be evaluated against the candidate dataset 275, the prediction engine 247 may proceed back to operation 630 to identify a next algorithm 280-3 using the submodular function 290. If at operation 6 the prediction engine 247 determines that there are no remaining algorithms 280 to be evaluated against the candidate dataset 275, the prediction engine 247 may proceed to operation 550 to report the outcome of the process 600.

At operation 650, the prediction engine 247 may report, to the user system 205, the best (optimal) algorithm 280 based on the results 287-1 to 287-n, the algorithms list 292 and/or the results 287-1 to 287-n. After performance of operation 650, the process 600 may end or repeat as necessary.

Figure 7:
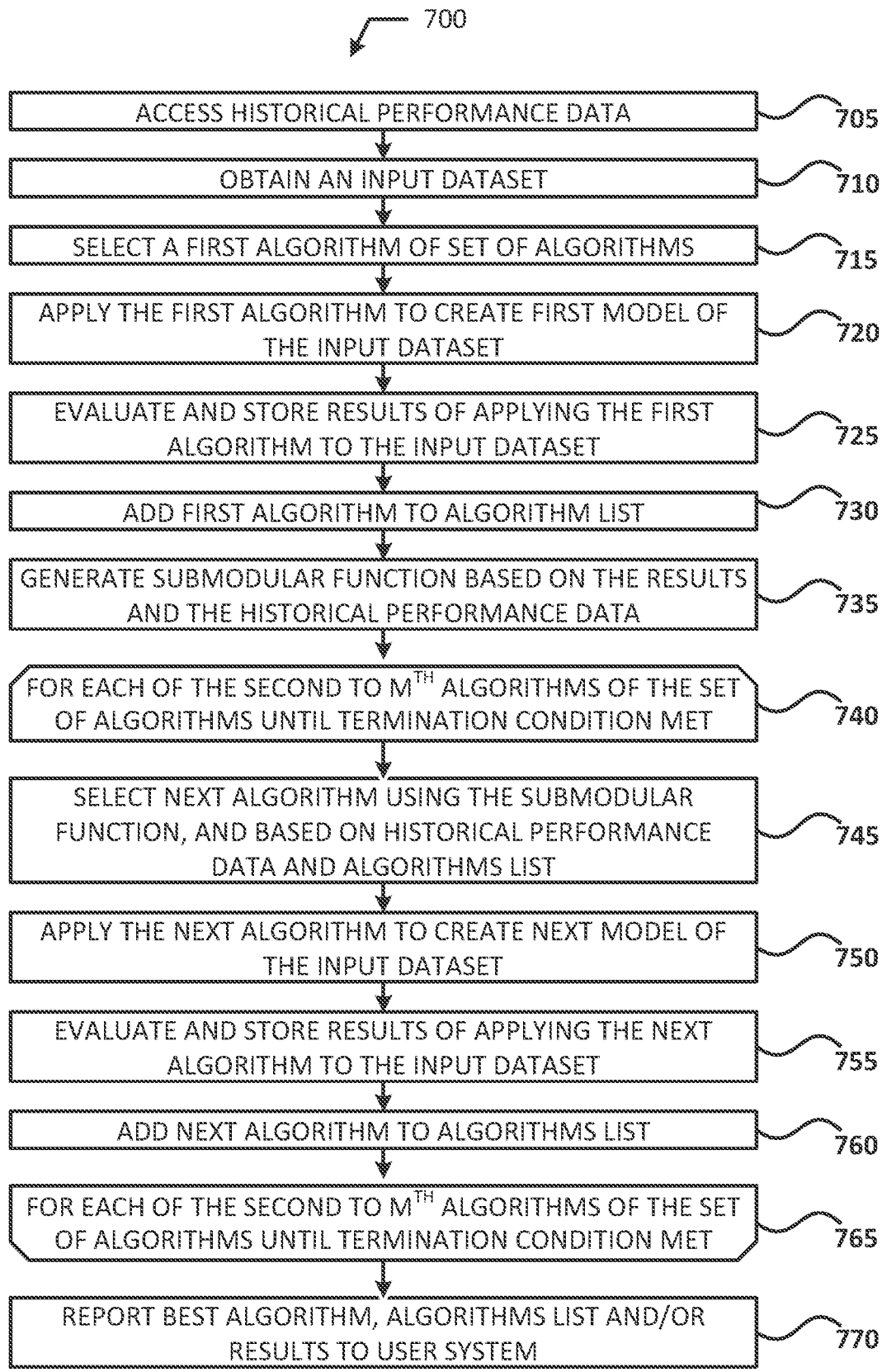
FIG. 7 illustrates another example process for selecting an optimum algorithm for a candidate dataset, in accordance with various embodiments.

FIG. 7 illustrates a process 700 for selecting an optimum algorithm 280 for a candidate dataset 275, in accordance with various other embodiments. Referring to FIG. 7, at operation 705 the prediction engine 247 may access historical performance data, such as benchmark data 284 stored in benchmark database 210. At operation 710, the prediction engine 247 may obtain an input dataset, such as candidate dataset 275. At operation 715, the prediction engine 247 may select a first algorithm 280-1 of a set of algorithms 280. At operation 720, the prediction engine 247 may apply the first algorithm 280-1 to the input dataset to create a first model of the input dataset. At operation 725, the prediction engine 247 may evaluate and store results 287-1 of applying the first algorithm 280-1 to the input dataset. At operation 730, the prediction engine 247 may add the first algorithm 280-1 to the algorithms list 292. At operation 735, the prediction engine 247 may generate a submodular function 290 based on the first results 287-1 and the historical performance data 284.

At opening loop operation 740, the prediction engine 247 may process, in turn, each of the second algorithm 280-2 through the mth algorithm 280-m of the set of algorithms until a termination condition is met. At operation 745, the prediction engine 247 may select, using the submodular function 290, a next algorithm 280 based on the historical performance data 284 and the algorithms list 292. At operation 750, the prediction engine 247 may apply the next algorithm 280 to the input dataset to create a next model of the input dataset. At operation 755, the prediction engine 247 may evaluate and store results 287 of applying the next algorithm 280 to the input dataset. At operation 760, the prediction engine 247 may add the next algorithm 280 to the algorithms list 292. At closing loop operation 765, the prediction engine 247 may iterate back to opening loop operation 740 to process a next algorithm 280, if any, or until a termination condition is met. The termination condition may be, for example, when the likelihood of finding a better-performing algorithm reaches some negligibly small value within some margin of error. Once all algorithms 280 of the set of algorithms have been processed and/or when the termination condition is met, the prediction engine 247 may proceed to operation 770 to report a best (optimum) algorithm 280 of the set of algorithms, or report the algorithms list 292 with the results 287-1 to 287-m. The best (optimum) algorithm 280 may be an algorithm in the list of algorithms 292 that is closest to fulfilling a predetermined criterion than other algorithms in the algorithms list 292. In embodiments, the predetermined criterion may be a threshold regression value, detection of a threshold number of anomalies, detecting a threshold number of classes in a multi-class classification scheme, and the like. After performance of operation 770, the prediction engine 247 may end the process 700 or repeat process 700 as necessary.

Persons of ordinary skill in the art will recognize that the present disclosure is not limited to what has been particularly shown and described hereinabove. Rather, the scope of the present disclosure includes both combinations and sub-combinations of the various features described hereinabove as well as modifications and variations that would occur to such skilled persons upon reading the foregoing description without departing from the underlying principles. Only the following claims, however, define the scope of the present disclosure.

The invention claimed is:

1. A non-transitory computer-readable storage medium including instructions, which when executed by one or more processors of a computing system, cause the computing system to:
   identify a set of algorithms;
   identify a set of benchmark datasets;
   generate a set of predictions by application of individual algorithms of the set of algorithms to individual benchmark datasets of the set of benchmark datasets;
   evaluate the set of predictions to obtain results;
   control storage of the results in a benchmark database;
   generate a submodular function based on the stored results;
   apply the individual algorithms to a candidate dataset;
   determine, with the submodular function, a likelihood that an optimum algorithm has been tested;
   determine, with the submodular function, a set of next algorithms;
   apply the set of next algorithms to the candidate dataset;
   identify the optimum algorithm, wherein the optimum algorithm is an individual algorithm of the set of algorithms or the set of next algorithms that is closest to fulfilling a predetermined criterion within the set of algorithms; and
   control transmission of a report indicating the optimum algorithm.

2. The non-transitory computer-readable storage medium of claim 1, wherein, in response to execution of the instructions, cause the computing system to:
   add the individual algorithms to a list of algorithms after application of the individual algorithms to the candidate dataset, and
   wherein, to identify the optimum algorithm, the computing system, in response to execution of the instructions, is to identify the optimum algorithm from among the individual algorithms in the list of algorithms based on the predetermined criterion.

3. The non-transitory computer-readable storage medium of claim 2, wherein, in response to execution of the instructions, cause the computing system to:
   evaluate another set of predictions to obtain other results, wherein the other set of predictions is obtained from the application of the individual algorithms to the candidate dataset; and
   control storage of the other results in the benchmark database, and wherein, to identify the optimum algorithm from among the individual algorithms, the computing system, in response to execution of the instructions, is to identify the optimum algorithm from among the individual algorithms in the list of algorithms further based on the stored other results.

4. The non-transitory computer-readable storage medium of claim 1, wherein:
   to identify the set of datasets, the computing system, in response to execution of
   the instructions, is to obtain the set of datasets from a benchmark datasets database, and
   to identify the set of algorithms, the computing system, in response to execution of the instructions, is to obtain the set of algorithms from a modeling algorithms database.

5. The non-transitory computer-readable storage medium of claim 1, wherein, to generate the set of predictions, the instructions cause the computing system to:
   control execution of the individual algorithms using, as an input, data of the individual benchmark datasets, and
   wherein the set of predictions comprises an output of the execution of the individual algorithms with the data of the individual datasets as the input.

6. The non-transitory computer-readable storage medium of claim 1, wherein, to evaluate the set of predictions, the instructions cause the computing system to:
   control performance of a holdout procedure using the set of predictions; or
   control performance of a two-fold cross-validation procedure using the set of predictions.

7. The non-transitory computer-readable storage medium of claim 1, wherein to control storage of the results, the instructions cause the computing system to:
   control storage, in the benchmark database, of identifiers of the individual algorithms and identifiers of the benchmark datasets in association with the individual algorithms.

8. The non-transitory computer-readable storage medium of claim 1, wherein, to apply the individual algorithms to the candidate dataset, the instructions cause the computing system to:
   control execution of the individual algorithms using, as an input, data of the candidate dataset; and
   control storage of an output of the execution of the individual algorithms with the data of the candidate dataset as the input.

* * * * *